(12) United States Patent
Hashimoto et al.

(10) Patent No.: US 7,637,295 B2
(45) Date of Patent: Dec. 29, 2009

(54) PNEUMATIC TIRE WITH TREAD INCLUDING SIPES HAVING BENT PORTIONS FORMED WITH ZIGZAG SHAPE WITH AMPLITUDE IN RADIAL DIRECTION

(75) Inventors: Yoshimasa Hashimoto, Hiratsuka (JP); Isamu Kishizoe, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 321 days.

(21) Appl. No.: 10/569,552

(22) PCT Filed: Sep. 29, 2004

(86) PCT No.: PCT/JP2004/014199

§ 371 (c)(1),
(2), (4) Date: Feb. 27, 2006

(87) PCT Pub. No.: WO2005/030502

PCT Pub. Date: Apr. 7, 2005

(65) Prior Publication Data

US 2006/0169377 A1    Aug. 3, 2006

(30) Foreign Application Priority Data

Sep. 29, 2003    (JP)    ............... 2003-337124

(51) Int. Cl.
*B60C 11/12*    (2006.01)

(52) U.S. Cl. ............. 152/209.15; 152/209.21; 152/209.23; 152/DIG. 3; 152/902

(58) Field of Classification Search ............ 152/209.15, 152/209.21, 209.23, DIG. 3, 902
See application file for complete search history.

(56) References Cited

U.S. PATENT DOCUMENTS

| | | | |
|---|---|---|---|
| 3,897,633 A | * | 8/1975 | Whitt ............ 33/432 |
| 4,794,965 A | * | 1/1989 | Lagnier ............ 152/DIG. 3 |
| 5,350,001 A | * | 9/1994 | Beckmann et al. ...... 152/DIG. 3 |
| 5,783,002 A | * | 7/1998 | Lagnier ............ 152/DIG. 3 |

FOREIGN PATENT DOCUMENTS

| | | |
|---|---|---|
| DE | 41 07 547 | 9/1991 |
| EP | 0 515 349 | 11/1992 |
| EP | 0 564 435 | 10/1993 |
| JP | 63-235107 | 9/1988 |
| JP | 09-323511 | * 12/1997 |
| JP | 11-48721 | 2/1999 |

(Continued)

OTHER PUBLICATIONS

International Search Report, Dec. 28, 2004.

*Primary Examiner*—Steven D Maki
(74) *Attorney, Agent, or Firm*—Greer, Burns & Crain, Ltd.

(57) ABSTRACT

Disclosed is a pneumatic tire which is allowed to increase block stiffness not only during braking and driving but also during cornering, and is allowed thereby to compatibly enhance tire performances both during braking and driving and during cornering. The pneumatic tire of the present invention is one where a plurality of longitudinal grooves extending in a tire circumferential direction and a plurality of lateral grooves extending in a tire widthwise direction are provided in a tread portion, a plurality of blocks are defined by these longitudinal and lateral grooves, and a plurality of sipes extending in the tire widthwise direction are provided to each of the blocks, wherein, with regard to each of the sipes, a zigzag shape is formed on a tread surface, bent portions ranging in the tire widthwise direction while bent in the tire circumferential direction are formed inside the block at at least two positions in the tire radial direction, and a zigzag shape with an amplitude in the tire radial direction is formed in each of the bent portions.

5 Claims, 8 Drawing Sheets

FOREIGN PATENT DOCUMENTS

| | | |
|---|---|---|
| JP | 11-310012 | 11/1999 |
| JP | 2000-006619 | 1/2000 |
| JP | 2001-001722 | 1/2001 |
| JP | 2002-192916 * | 7/2002 |
| JP | 2002-301910 | 10/2002 |
| JP | 2002-321509 | 11/2002 |
| JP | 2002-356105 | 12/2002 |
| JP | 2003-025812 | 1/2003 |

* cited by examiner

PNEUMATIC TIRE WITH TREAD INCLUDING SIPES HAVING BENT PORTIONS FORMED WITH ZIGZAG SHAPE WITH AMPLITUDE IN RADIAL DIRECTION

TECHNICAL FIELD

The present invention relates to a pneumatic tire where a plurality of sipes are provided in a block, and more specifically, relates to a pneumatic tire which is allowed, by shapes of the sipes, to increase block stiffness not only during braking and driving but also during cornering, and is allowed thereby to compatibly enhance tire performances both during braking and driving and during cornering.

BACKGROUND ART

In an icy and snowy road pneumatic tire, as improving measures for on-ice performances, increasing an edge amount of sipes provided in a block thereof, reducing hardness of tread rubber, and the like have been generally attempted. However, in the case where tread rubber is reduced in hardness, block stiffness is reduced. This causes the block to fall down during braking and driving and during cornering, and hence leads to reduction in ground contact area of the tire, and as a result, tire performances both during summer and during winter are deteriorated. Accordingly, for the purpose of preventing the block from falling down, it has been proposed that a sipe should be formed in a three-dimensional shape.

As a sipe having a three-dimensional shape, one where a zigzag shape is formed on a tread surface, and an amplitude of the zigzag shape is varied inside the block has been proposed (for example, refer to Patent Document 1). In this case, although it is possible to increase block stiffness during braking and driving, there is a disadvantage that an effect of increasing block stiffness during cornering can be scarcely obtained.

In addition, a sipe where a zigzag shape is formed on a tread surface, and triangular pyramids and inverted triangular pyramids are alternately arranged inside the block has been proposed (for example, refer to Patent Document 2). In this case, although it is possible to expect an effect of increasing block stiffness during cornering, there is a disadvantage that a place where it can be arranged is limited because the sipe has a direction.

Moreover, a sipe where a zigzag shape is formed on a tread surface, and bent portions ranging in a tire radial direction and being bent in a tire widthwise direction are formed inside the block, has been proposed (for example, refer to Patent Document 3). In this case as well, there is a disadvantage that block stiffness during cornering is low as compared to block stiffness during braking and driving.

[Patent Document 1] Japanese patent application Kokai publication No. 2000-6619

[Patent Document 2] Japanese patent application Kokai publication No. 2002-301910

[Patent Document 3] Japanese patent application Kokai publication No. 2002-321509

DISCLOSURE OF THE INVENTION

An object of the present invention is to provide a pneumatic tire which is allowed, depending on a shape of sipes, to increase block stiffness not only during braking and driving but also during cornering, and is allowed thereby to compatibly enhance tire performances both during braking and driving and during cornering.

A pneumatic tire for achieving the above object is a pneumatic tire where a plurality of longitudinal grooves extending in a tire circumferential direction and a plurality of lateral grooves extending in a tire widthwise direction are provided in a tread portion, a plurality of blocks are defined by these longitudinal and lateral grooves, and a plurality of sipes extending in the tire widthwise direction are provided to each of the blocks. The tire is characterized in that, with regard to each of the sipes, a zigzag shape with an amplitude in the tire circumferential direction is formed on a tread surface, bent portions ranging in the tire widthwise direction while bent in the tire circumferential direction are formed inside the block at at least two positions in a tire radial direction, and a zigzag shape with an amplitude in the tire radial direction is formed in each of the bent portions.

In the present invention, because each of the sipes is provided in at least two positions in the tire radial direction with the bent portions bent in the tire circumferential direction and ranging in the tire widthwise direction, small blocks on both sides of the sipe are engaged with each other to suppress deformation of a block even during braking and driving, whereby tire performances during braking and driving can be enhanced. In addition, with regard to the above-described sipe, a zigzag shape with an amplitude in the tire radial direction is formed in the bent portions, whereby small blocks on both sides of the sipe are engaged with each other to suppress deformation of a block even during cornering, whereby tire performances during cornering can be enhanced. Therefore, even if tread rubber is reduced in hardness, tire performances during braking and driving and those during cornering are compatibly enhanced. Additionally, because the above sipe has no directionality, a place where it is arranged is not limited. Furthermore, according to the above sipe, there is an advantage that a difference is small between edge lengths when the tire is new and that when the tire is in a middle period and later in terms of abrasion.

In the present invention, in order to sufficiently obtain, without damaging mold releasability, an improving effect on tire performances both during braking and driving and during cornering, it is preferable that a tilt angle of the sipe in the tire circumferential direction to a normal-line direction of the tread surface be in a range of 10 to 45 degrees, and the amplitude of the bent portion of the sipe in the tire radial direction be in a range of 0.5 to 5.0 mm.

According to the present invention, it is possible to suppress deterioration in mold releasability by appropriately setting the tilt angle of the sipe in the tire circumferential direction to the normal-line direction of the tread surface and the amplitude of the bent portion of the sipe in the tire radial direction. In some cases, however, there arises a failure such as a breakage in the block generated by a sipe-forming blade used during mold release.

Consequently, for the purpose of more securely avoiding such a failure as the block break, in the above pneumatic tire, it is preferable that, while the amplitude of the sipe in the tire circumferential direction be constant, a tilt angle of the sipe in the circumferential direction to a normal-line direction of a tread surface be smaller in a portion closer to a bottom of the sipe than that in a portion closer to the tread surface, and the amplitude of the bent portions in the tire radial direction be larger in a portion closer to a bottom of the sipe than that in a portion closer to the tread surface.

That is, even in the case where the amplitude of the sipe in the tire circumferential direction is constant, releasability from a mold can be enhanced by setting a tilt angle of the sipe in the tire circumferential direction to the normal-line direction of the tread surface to be smaller in a portion closer to the sipe bottom. Moreover, even in the case where tilt angles of the sipe in the tire circumferential direction are thus varied, reduction in block stiffness during braking and driving is suppressed, and at the same time, block stiffness during cornering is increased by having the amplitude of the bent portions in the tire radial direction to be larger in the portion closer to the sipe bottom.

In this case, it is preferable that tilt angles of the sipe in the tire circumferential direction to the normal-line direction of the tread surface be between 30 and 45 degrees in the portion closest to the tread surface, and be not smaller than 15 degrees, but smaller than 30 degrees in the portion closest to the sipe bottom. Moreover, it is preferable that amplitudes of the bent portions in the tire radial direction be not less than 0.5 mm in the portion closest to the tread surface, and is set not more than 3.5 mm in the portion closest to the sipe bottom.

Furthermore, for the purpose of more securely avoiding such a failure as the block break, in the above pneumatic tire, it is desirable that, while intervals between the bent portions of the sipe in the tire radial direction be uniform, the amplitude in the tire circumferential direction be smaller in a portion closer to the sipe bottom. Thereby, resistance during mold release is reduced, and therefore releasability of the pneumatic tire from a mold can be enhanced.

In this case, it is preferable to employ the following structure for the purpose of ensuring favorable releasability. Specifically, if it is assumed that there are a reference line passing through a position representing an outer limit of the amplitude of the sipe on the tread surface and extending in the normal-line direction of the tread surface, and an auxiliary line defining, along the depth direction of the sipe, the amplitude of the sipe in the tire circumferential direction, it is preferable that a distance at the sipe bottom between the reference line and the auxiliary line be more than 0% and not more than 50% of the amplitude of the sipe in the tire circumferential direction on the tread surface.

Alternatively, if it is assumed that there are a reference line passing through a position representing an outer limit of an amplitude of the sipe on the tread surface and extending in the normal-line direction of the tread surface, an upper auxiliary line defining the amplitude of the sipe in the tire circumferential direction in the upper portion of the sipe, and a lower auxiliary line defining the amplitude of the sipe in the tire circumferential direction in the lower portion of the sipe, it is preferable that tilt angles respectively of the upper and lower auxiliary lines to the reference line be made different from each other, and the tilt angle of the lower auxiliary line be larger than that of the upper auxiliary line. More specifically, it is preferable that a distance at the sipe bottom between the reference line and the upper auxiliary line be more than 0% and not more than 25% of the amplitude of the sipe in the tire circumferential direction on the tread surface, and a distance at the sipe bottom between the reference line and the upper auxiliary line be more than 25% and not more than 50% of the amplitude of the sipe in the tire circumferential direction on the tread surface.

In the present invention, for the purpose of allowing excellent traveling performances to be exerted on icy and snowy roads immediately after the start of use, it is possible to provide, on a superficial portion of a block, a plurality of shallow grooves whose depth is in a range of 0.1 to 1.0 mm and which are shallower than the sipes. In a pneumatic tire to which the thus described shallow grooves are provided, it is preferable that a vertical portion extending in a normal-line direction of the tread surface be provided to the sipe in a section where the sipe joins to the tread surface, for the purpose of avoiding a failure in mold release which occurs due to interference between the shallow groove and the sipe. It is favorable that a height of the vertical portion of the sipe be not less than the depth of the shallow groove.

Although remarkable operational effects can be obtained when the present invention is applied to an icy and snowy road pneumatic tire represented by a studless tire, it is also possible to apply the invention to a all-season pneumatic tire.

BRIEF DESCRIPTION OF THE DRAWINGS

FIGS. 8a, 8b, and 8c are a side view, a cross-sectional view taken along an VIII-VIII line of FIG. 8a, and a cross-sectional view taken along an VIII'-VIII' line of FIG. 8a, respectively.

FIGS. 9a, 9b, and 9c are a side view, a cross-sectional view taken along a IX-IX line of FIG. 9a, and a cross-sectional view taken along a IX'-IX' line of FIG. 9a, respectively.

BEST MODE FOR CARRYING OUT THE INVENTION

Hereinafter, detailed descriptions will be given of configurations of the present invention with reference to the attached drawings.

Figure 1:
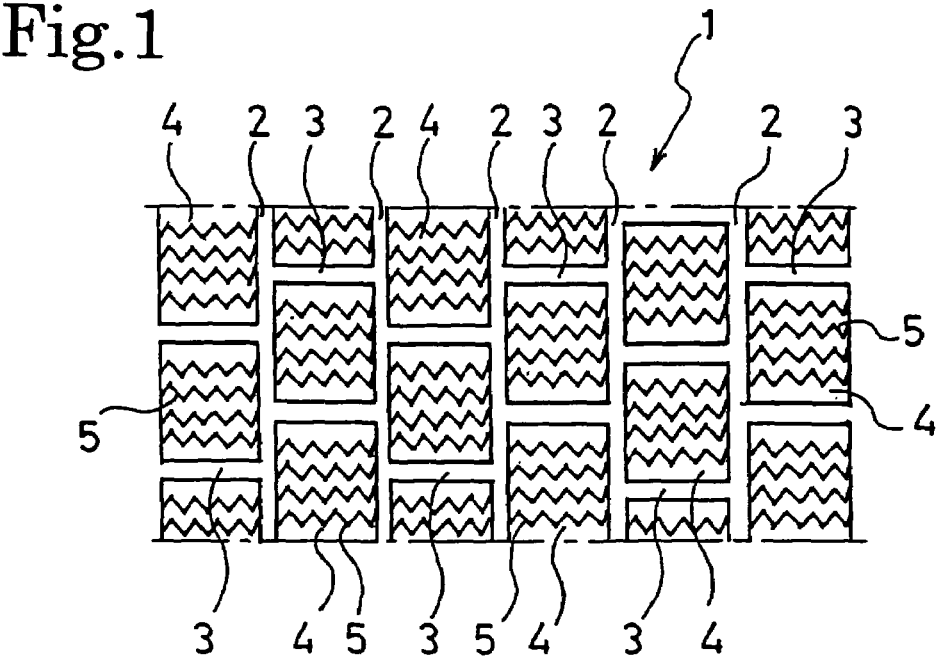
FIG. 1 is a plan view showing a tread pattern of an icy and snowy road pneumatic tire formed of an embodiment of the present invention.
Figure 2:
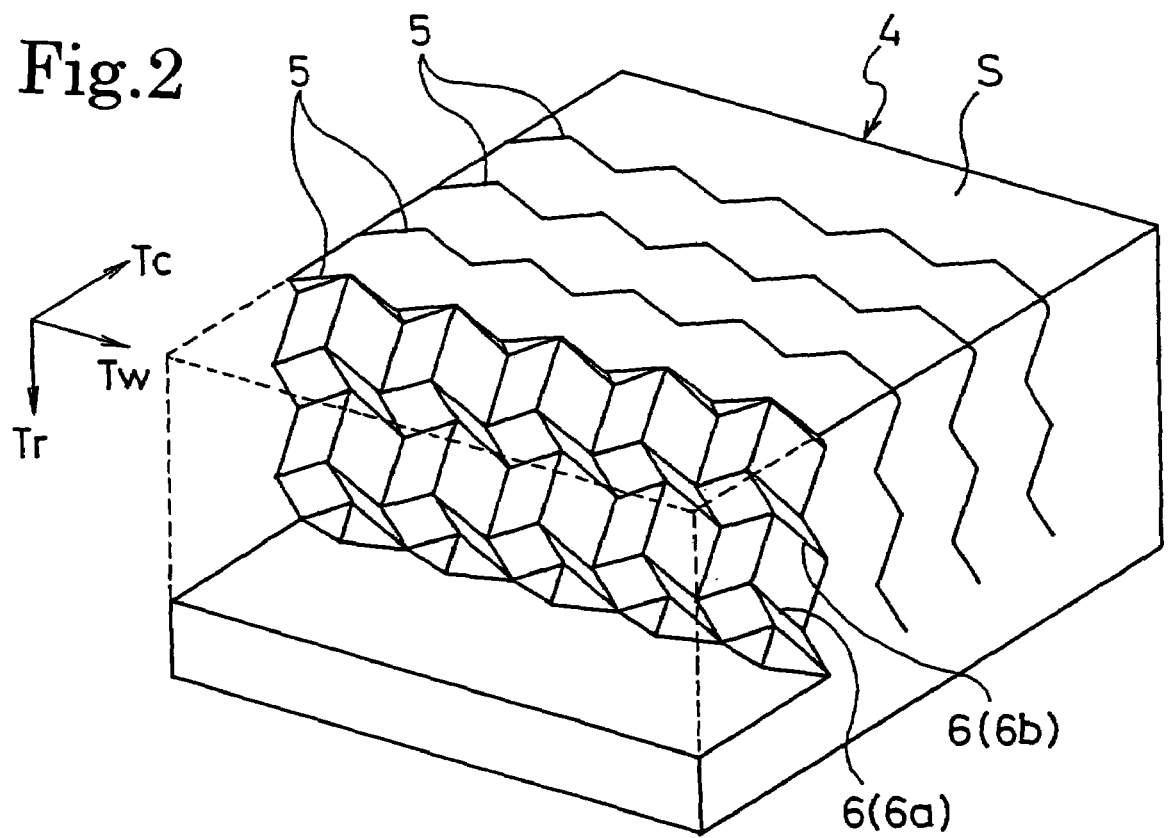
FIG. 2 is a partially crosscut perspective view showing a block of the icy and snowy road pneumatic tire formed of the embodiment of the present invention.
Figure 3:
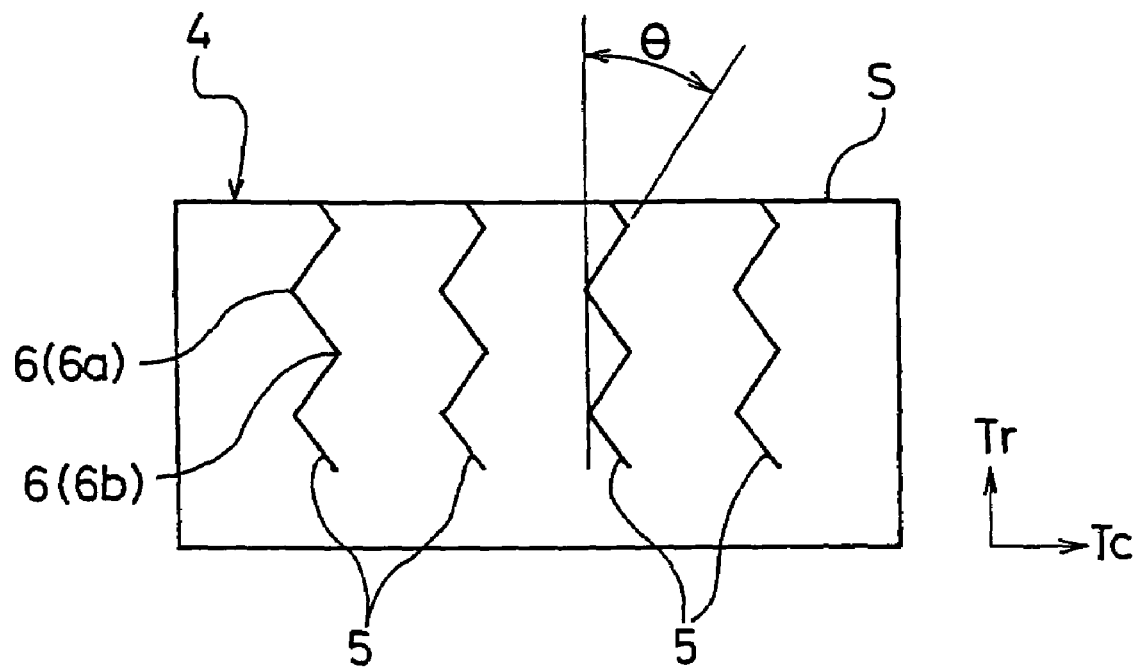
FIG. 3 is a side view of the block in FIG. 2.
Figure 4:
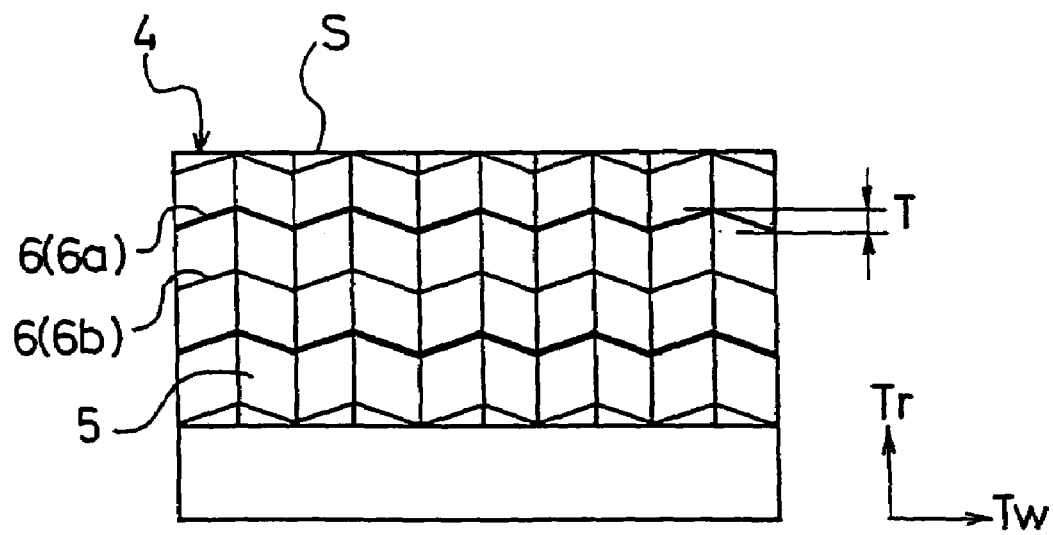
FIG. 4 is a side view showing an inner wall surface of a sipe in the block in FIG. 2.

FIG. 1 shows a tread pattern of an icy and snowy road pneumatic tire formed of an embodiment of the present invention, and FIG. 2 shows a block thereof. FIG. 3 shows a side of the above block, and FIG. 4 shows an inner wall surface of a sipe in the above block.

As shown in FIG. 1, a plurality of longitudinal grooves 2 extending in a tire circumferential direction, and a plurality of lateral grooves 3 extending in a tire widthwise direction are formed on a tread portion 1, and a plurality of blocks 4 are defined by theses longitudinal grooves 2 and lateral grooves 3. Additionally, in each of the blocks 4, a plurality of sipes 5 extending in the tire widthwise direction are formed. Note that a shape of the block 4 and the number of sipes 5 are not particularly limited.

As shown in FIG. 2, each of the sipes 5 forms a zigzag shape having its amplitude in the tire circumferential direction on a tread surface S. Inside the block, in at least two positions in a tire radial direction (Tr), a plurality of bent portions 6 bent in the tire circumferential direction (Tc) and ranging in the tire width direction (Tw) are formed. These bent portions 6 include a convex bent portion 6a and a concave bent portion 6b. On one wall surface of the sipe 5, the convex bent portion 6a and the concave bent portion 6b are alternately arranged, and on the other wall surface (not shown) facing the one wall surface, a positional relation with respect to the convex bent portion 6a and the concave bent portion 6b is opposite to that on the one wall surface. In the case where the bent portions 6 bent in the tire circumferential direction are provided in each of the sipes 5, small blocks on both sides of each of the sipes 5 are engaged with each other during braking and driving, whereby deformation of the black 4 is suppressed, and hence falling down of the block 4 in the tire circumferential direction can be suppressed. Note that, by providing at least two of the bent portions 6 with respect to each of the sipes 5, a difference in block stiffness occurring from a forward rotation and a backward rotation can be avoided.

As shown in FIG. 3, a tilt angle θ of the sipe 5 in the tire circumferential direction to a normal-line direction of the tread surface S may be set in a range of 10 to 45 degrees. If the tilt angle θ is less than 10 degrees, an effect of bearing the falling down of the block 4 during braking and driving becomes insufficient, and to the contrary, if the tilt angle θ exceeds 45 degrees, mold releasability is deteriorated.

As shown in FIG. 4, in the bent portions 6, the sipe 5 forms a zigzag shape with an amplitude T in the tire radial direction (Tr). In the case where, in the bent portions 6, the sipe 5 is formed in a zigzag shape with an amplitude T in the tire radial direction, small blocks on both sides of each of the sipes 5 are engaged with each other during cornering, whereby deformation of the black 4 is suppressed, and hence falling down of the block 4 in the tire widthwise direction is suppressed. It is favorable that the amplitude T of the bent portions 6 be set in a range of 0.5 to 5.0 mm. If this amplitude T is less than 0.5 mm, an effect of bearing the falling down of the block 4 during cornering becomes insufficient, and to the contrary, if it exceeds 5.0 mm, mold releasability is deteriorated.

In the above-described icy and snowy road pneumatic tire, it is favorable that a JIS-A hardness (at 0° C.) of a rubber composition constituting the tread portion be in a range of 40 to 60, and preferably 45 to 55. If the JIS-A hardness of the tread rubber is less than 40, the falling down of the block 4 becomes more likely to occur, and to the contrary, if it exceeds 60, on-ice friction is reduced.

According to the above-described icy and snowy road pneumatic tire, since the sipe 5 is provided with bent portions 6 bent in the tire circumferential direction (Tc) and ranging in the tire width direction (Tw) in at least two positions in the tire radial direction (Tr), small blocks on both sides of the sipe 5 are engaged with each other during braking and driving, whereby the deformation of the block 4 is suppressed, and hence tire performances during braking and driving can be enhanced. Moreover, since, with regard to the sipe 5, a zigzag shape with an amplitude T in the tire radial direction (Tr) is formed in the bent portions 6, small blocks on both sides of the sipe 5 are engaged with each other also during cornering, whereby block deterioration is suppressed, and hence tire performances during cornering can be enhanced.

Accordingly, even if where tread rubber is reduced in hardness, it becomes possible to compatibly enhance tire performances during braking and driving and tire performances during cornering. Particularly, because it becomes possible to increase a number of sipes per block and to use rubber which is low in hardness as tread rubber, tire performances during summer can be maintained while on-ice performances is enhanced.

Figure 5:
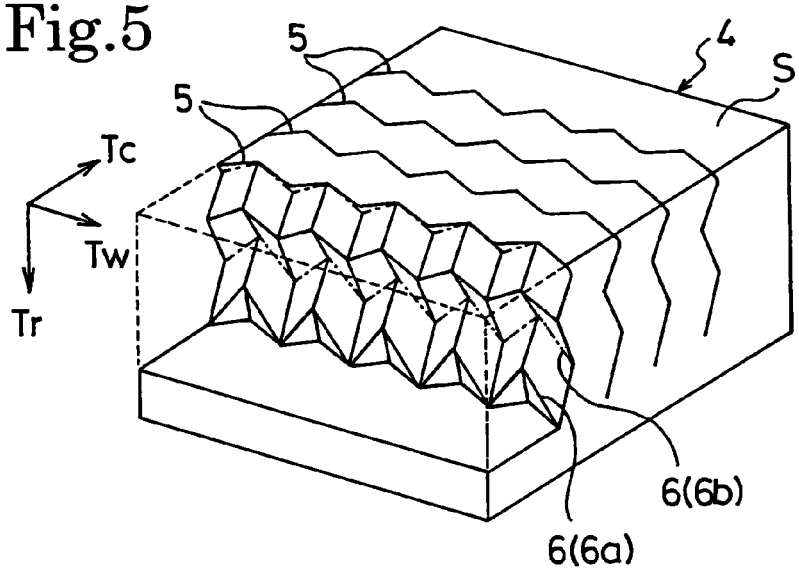
FIG. 5 is a partially crosscut perspective view showing a block of an icy and snowy road pneumatic tire formed of a first other embodiment of the present invention.

FIG. 5 shows a block of an icy and snowy road pneumatic tire formed of a first other embodiment of the present invention. Additionally, FIG. 6 shows parts of an inner wall surface of a sipe in the block in FIG. 5, and FIG. 7 is a cross-sectional view taken along a VII-VII line of FIG. 6.

In FIG. 5, on a tread surface S, each of the sipes 5 forms a zigzag shape with an amplitude in the tire circumferential direction. Inside the block, each of the sipes 5 forms in at least two positions in a tire radial direction (Tr) a plurality of bent portions 6 bent in the tire circumferential direction (Tc) and ranging in the tire width direction (Tw). These bent portions 6 include a convex bent portion 6a and a concave bent portion 6b. On one wall surface of the sipe 5, the convex bent portion 6a and the concave bent portion 6b are alternately arranged, and on the other wall surface (not shown) facing the one wall surface, a positional relation with respect to the convex bent portion 6a and the concave bent portion 6b is opposite to that on the one wall surface. In the case where the bent portions 6 bent in the tire circumferential direction are provided in each of the sipes 5, small blocks on both sides of each of the sipes 5 are engaged with each other during braking and driving, whereby deformation of the block 4 is suppressed, and hence falling down of the block 4 in the tire circumferential direction is suppressed. Note that, by providing at least two of the bent portions 6 with respect to each of the sipes 5, a difference in block stiffness occurring from forward and backward rotations of the tire can be avoided.

Figure 6:
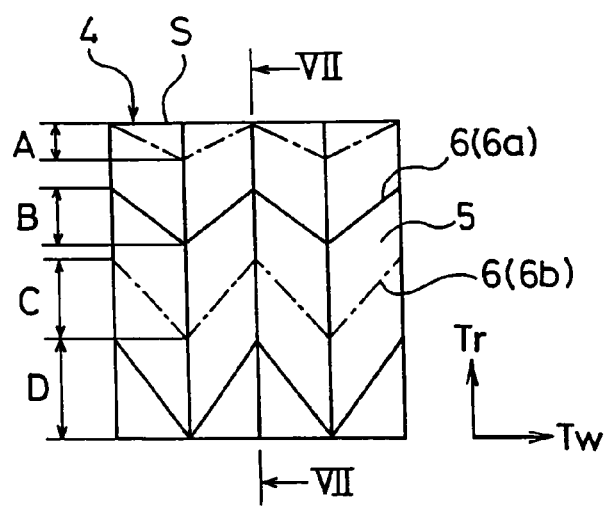
FIG. 6 is a side view showing an inner wall surface of a sipe in the block in FIG. 5.
Figure 7:
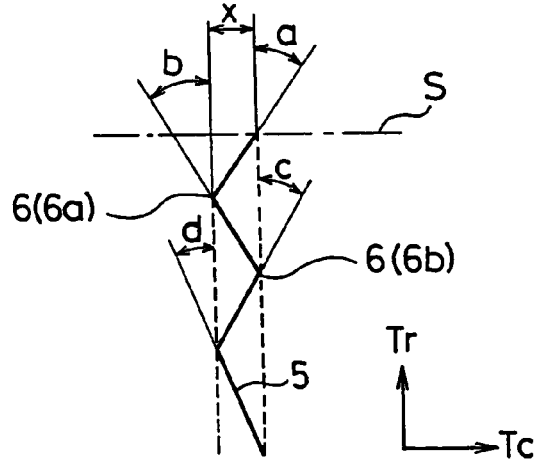
FIG. 7 is a cross-sectional view taken along a VII-VII line of FIG. 6.

As shown in FIG. 6, in the bent portions 6, the sipe 5 forms zigzag shapes which have amplitudes A, B, C and D, respectively, in the tire radial direction (Tr). In the case where the sipe 5 forms, in the bent portions 6, zigzag shapes which have amplitudes A, B, C and D, respectively, in the tire radial direction (Tr), small blocks on both sides of the sipe 5 are engaged with each other during cornering, whereby deformation of the block 4 is suppressed, and hence the falling down of the block 4 in the tire widthwise direction can be suppressed.

In FIG. 6, the amplitudes A, B, C and D of the bent portions 6 in the tire radial direction are larger in portions closer to the sipe bottom than in portions closer to the tread surface. In a manner that the amplitudes A, B, C and D of the bent portions 6 in the tire radial direction are made larger in the portions closer to the sipe bottom, while reduction in block stiffness during braking and driving can be suppressed, block stiffness during cornering also can be enhanced.

More specifically, it is favorable that the amplitude A of the bent portions 6 at the portion closest to the tread surface be set to at least 0.5 mm, and that the amplitude D of the bent portions 6 at the portion closest to the sipe bottom be set to 3.5 mm or less. If the amplitude A of the bent portions 6 at the portion closest to the tread surface is less than 0.5 mm, reduction in block stiffness becomes remarkable. On the other hand, if the amplitude D of the bent portions 6 at the portion closest to the sipe bottom exceeds 3.5 mm, mold release becomes difficult. By forming the sipe 5 in a manner that the amplitudes A, B, C and D of the bent portions 6 are gradually increased from the portion closest to the tread surface to the portion closest to the sipe bottom, it becomes possible to compatibly achieve maintenance of block stiffness and mold releasability in a balanced manner.

As shown in FIG. 7, an amplitude X of the sipe 5 in the tire circumferential direction is set constant over an entire length in a depth-wise direction of the sipe 5. Additionally, tilt angles a, b, c and d of the sipe 5 to a normal-line direction of the tread surface S are smaller in portions closer to the sipe bottom than in portions closer to the tread surface. In a manner that the tilt angles a, b, c and d of the sipe 5 to a normal-line direction of the tread surface S are decreased from the portion closest to the tread surface to the portion closest to the sipe bottom, mold releasability can be enhanced.

More specifically, it is favorable that the tilt angles a at the portion closest to the tread surface be set between 30 degrees and 40 degrees, and that the tilt angles d at the portion closest to the sipe bottom be set not smaller than 15 degrees, but smaller than 30 degrees. If the tilt angles a at the portion closest to the tread surface is less than 30 degrees, reduction in block stiffness becomes remarkable, and to the contrary, if it exceeds 45 degrees, mold release becomes difficult. If the tilt angles d at the portion closest to the sipe bottom is less than 15 degrees, reduction in block stiffness becomes remarkable, and to the contrary, if it is not less than 30 degrees, mold release becomes difficult. By forming the sipe 5 in a manner that the tilt angles a, b, c and d are gradually decreased from the portion closest to the tread surface to the portion closest to the sipe bottom, more smooth mold release becomes possible.

According to the above-described icy and snowy road pneumatic tire, as in the case with the foregoing embodiment, even if tread rubber is reduced in hardness, it is possible to compatibly enhance tire performances during braking and driving and tire performances during cornering. Moreover, according to the present embodiment, mold releasability is enhanced, whereby a failure such as a breakage in the block can be more securely avoided.

FIGS. 8a to 8c show parts of an inner side wall of the sipe in the block of the icy and snowy road pneumatic tire formed of a second other embodiment of the present invention, and FIGS. 8a, 8b, and 8c are a side view, a cross-sectional view taken along an VIII-VIII line of FIG. 8a, and a cross-sectional view taken along an VIII'-VIII' line of FIG. 8a, respectively. In the present embodiment, a basic structure of the block is the same as that shown in FIGS. 1 and 2, and a detailed description thereof will be omitted.

In FIGS. 8a to 8c, the sipe 5 is formed in a manner that: intervals λ between bent portions 6 including the convex bent portions 6a and concave bent portions 6b in the tire radial direction (Tr) are made constant; and amplitudes of the bent portions 6 in the tire circumferential direction (Tc) are gradually decreased with increasing closeness to the sipe bottom. Here, that the intervals λ are constant means that a range of variation among the internals λ is not more than 1.0 mm.

If it is assumed that there are a reference line L (a straight line) passing through a position representing an outer limit of an amplitude of the sipe 5 on a tread surface S and extending in the normal-line direction of the tread surface S, and an auxiliary line G (a straight line) defining, along the depth direction of the sipe, the amplitude of the sipe 5 in the tire circumferential direction (Tc), it is preferable that a distance W at the sipe bottom between the reference line L and the auxiliary line G be set more than 0% and not more than 50% of the amplitude X of the sipe 5 in the tire circumferential direction on the tread surface S. That is, it is favorable that a relation expressed by 0 mm<W≦(½)X be satisfied. If this distance W does not exceed 0 mm, an improving effect on mold releasability cannot be obtained, and to the contrary, if it exceeds 50% of the amplitude X, block stiffness becomes insufficient.

According to the above-described icy and snowy road pneumatic tire, as in the case with the foregoing embodiments, even if tread rubber is reduced in hardness, it is possible to compatibly enhance tire performances during braking and driving and tire performances during cornering. Moreover, according to the present embodiment, mold releasability is enhanced, whereby a failure such as a breakage in the block can be more securely avoided. Note that, if the intervals λ between the bent portions 6 in the tire radial direction (Tr) are increased with increasing closeness to the bottom of the sipe 5, although an improving effect on mold releasability can be expected, it is difficult to apply such a structure to a case using shallow sipes. Alternatively, if the amplitudes of the bent portions 6 in the tire circumferential direction (Tc) are decreased with increasing closeness to the bottom of the sipe 5 while the intervals λ between the bent portions 6 in the tire radial direction (Tr) are made constant, an improving effect on mold releasability also can be securely enjoyed in the case of using shallow sipes.

FIGS. 9a to 9c show parts of an inner side wall of a sipe in a block of an icy and snowy road pneumatic tire formed of a third other embodiment of the present invention, and FIGS. 9a, 9b, and 9c are a side view, a cross-sectional view taken along a IX-IX line of FIG. 9a, and a cross-sectional view taken along a IX'-IX' line of FIG. 9a, respectively. In the present embodiment, a basic structure of the block is the same as that shown in FIGS. 1 and 2, and a detailed description thereof will be omitted.

In FIGS. 9a to 9c, it is assumed that there are a reference line L (a straight line) passing through a position representing an outer limit of an amplitude of the sipe 5 on a tread surface S and extending in the normal-line direction of the tread surface S, an upper auxiliary line G1 (a straight line) defining an amplitude of the sipe 5 in the tire circumferential direction (Tc) in the upper portion Y1 of the sipe 5, and a lower auxiliary line G2 (a straight line) defining an amplitude of the sipe 5 in the tire circumferential direction (Tc) in the lower portion Y2 of the sipe 5. Under that assumption, tilt angles respectively of the upper and lower auxiliary lines G1 and G2 to the reference line L are made different from each other, and the tilt angle of the lower auxiliary line G2 is larger than that of the upper auxiliary line G1.

In particular, it is preferable that: a distance W1 at the bottom of the sipe 5 between the reference line L and the upper auxiliary line G1 be more than 0% and not more than 25% of the amplitude X of the sipe 5 on the tread surface S in the tire circumferential direction (Tc); and a distance W2 at the bottom of the sipe 5 between the reference line L and the upper auxiliary line G2 be not less than 25% and not more than 50% of the amplitude X of the sipe 5 on the tread surface S in the tire circumferential direction (Tc). That is, it is favorable that relations respectively expressed by $0 mm < W1 \leq (1/4)X$, and $(1/4)X \leq W2 \leq (1/2)X$ be satisfied.

According to the above-described icy and snowy road pneumatic tire, as in the case with the foregoing embodiments, even if tread rubber is reduced in hardness, it is possible to compatibly enhance tire performances during braking and driving and tire performances during cornering. Moreover, according to the present embodiment, while reduction in block stiffness is suppressed to a minimum level by making relatively small the tilt angle of the auxiliary line G1 in the upper portion Y1 of the sipe 5, an improving effect on mold releasability can be fully exerted by making relatively large the tilt angle of the auxiliary line G2 in the lower portion Y2 of the sipe 5.

Figure 10:
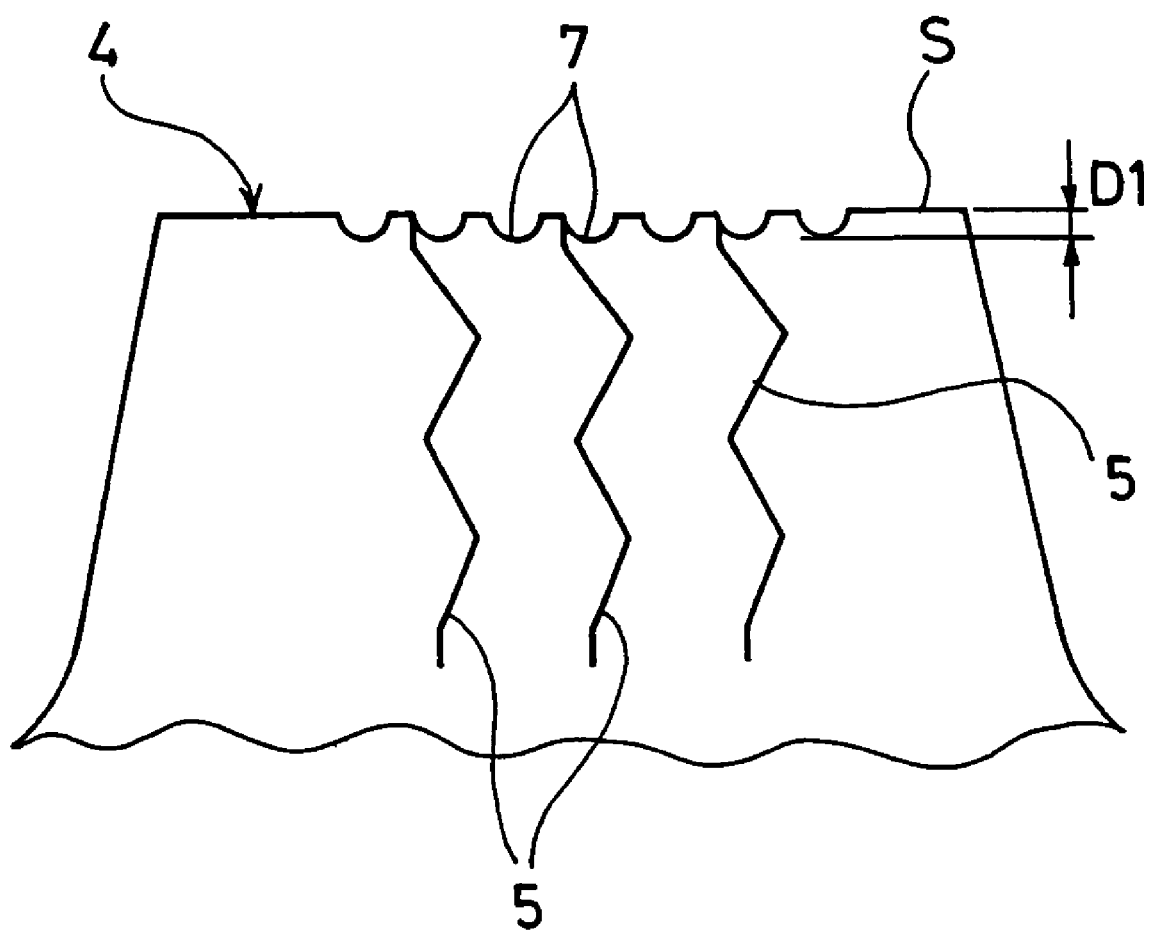
FIG. 10 is a side view showing a block of an icy and snowy road pneumatic tire formed of a fourth other embodiment of the present invention.
Figures 11A, 11B, 11C:
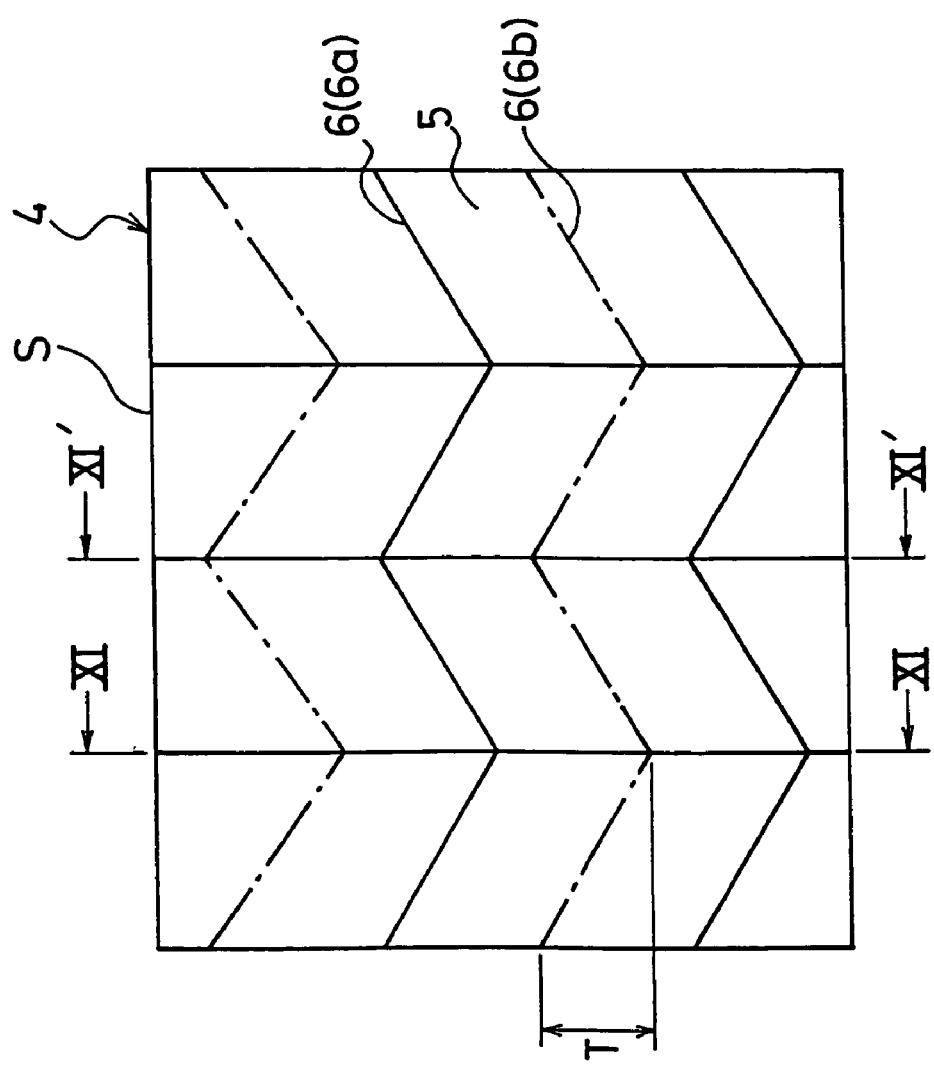
FIGS. 11a to 11c show parts of an inner side wall of a sipe in the block in FIG. 10, and FIGS. 11a, 11b, and 11c are a side view, a cross-sectional view taken along an XI-XI line of FIG. 11a, and a cross-sectional view taken along an XI'-XI' line of FIG. 11a, respectively.

FIG. 10 shows a block of an icy and snowy road pneumatic tire formed of a fourth other embodiment of the present invention. FIGS. 11a to 11c show parts of an inner side wall of a sipe in the foregoing block, and FIGS. 11a, 11b, and 11c are a side view, a cross-sectional view taken along an XI-XI line of FIG. 11a, and a cross-sectional view taken along an XI'-XI' line of FIG. 11a, respectively. In the present embodiment, a basic structure of the block is the same as that shown in FIGS. 1 and 2, and a detailed description thereof will be omitted.

In FIG. 10, for the purpose of allowing excellent traveling performances to be exerted on icy and snowy roads immediately after the start of use, a plurality of shallow grooves 7 which are shallower than the sipes 5 are formed on a superficial portion of the block 4. A depth D1 of each of the shallow grooves 7 is set in a range of 0.1 to 1.0 mm. An extending direction of these shallow grooves 7 is not particularly limited, and for example, they can be arranged in a manner that they tilt with respect to the tire circumferential direction.

In the case where such shallow grooves 7 as described above are provided, it is favorable, for the purpose of avoiding a failure in mold release which occurs due to interference between the shallow groove 7 and the sipe 5, that a vertical portion extending in a normal-line direction of the tread surface S be provided in a section of the sipe 5 joining to a tread surface S as shown in FIGS. 11a to 11c. Additionally, it is preferable that a height D2 of the vertical portion of the sipe 5 be equal to or greater than the depth D1 of the shallow groove 7. That is, it is favorable that a relation expressed by $D1 \leq D2$ be satisfied. With these configurations, interference on the tread surface S between the minute shallow groove 7 (surface work) and the sipe 5 is prevented, whereby mold releasability can be further enhanced.

Note that, although amplitudes of the sipe 5 in the tire circumferential direction (Tc) are defined based on a single auxiliary line G in the embodiment shown in FIGS. 11a to 11c, the amplitudes may be defined by a combination of an upper auxiliary line G1 and a lower auxiliary line G2 as in the case with the preceding embodiment.

While the detailed descriptions have been given of the preferred embodiments of the present invention hereinabove, it should be understood that various modifications to, substitutions for, and replacements with the preferred embodiment can be carried out as long as the modifications, the substitutions, and the replacements do not depart from the spirit and the scope of the present invention defined by the attached claims.

EXAMPLES

First, tires for Conventional Examples 1 to 3 and Example 1 were prepared as icy and snowy road pneumatic tires each of which had a tire size of 195/65R15 91Q and a block pattern, and which were made variously different only in shape of the sipes provided in the block.

Figure 12:
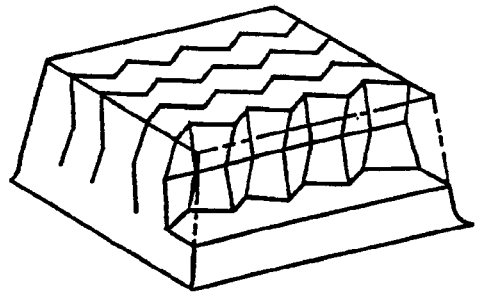
FIG. 12 is a perspective view showing a block of Conventional Example 1.
Figure 13:
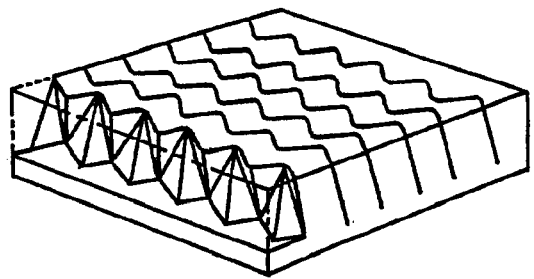
FIG. 13 is a perspective view showing a block of Conventional Example 2.
Figure 14:
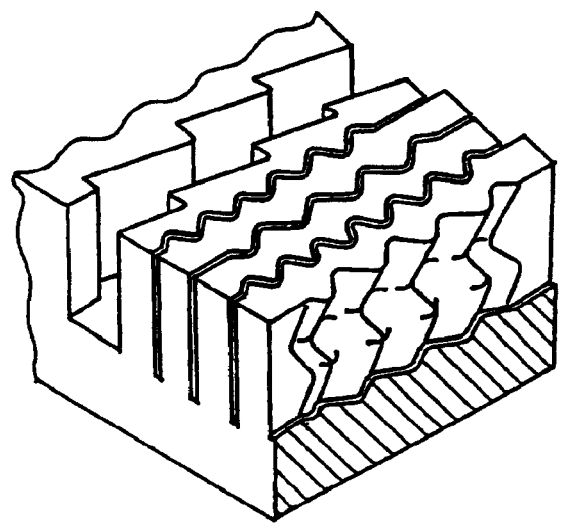
FIG. 14 is a perspective view showing a block of Conventional Example 3.

Conventional Example 1 is the one, as described in Japanese patent application Kokai publication No. 2000-6619, adopting sipes each of which forms a zigzag shape on a tread surface of the tire, and has amplitudes of zigzag shapes varied inside the block (refer to FIG. 12). Conventional Example 2 is the one, as described in Japanese patent application Kokai publication No. 2002-301910, adopting sipes each of which forms a zigzag shape on a tread surface of the tire, and has triangular pyramids and inverted triangular pyramids alternately arranged inside the block (refer to FIG. 13). Conventional Example 3 is the one, as described in Japanese patent application Kokai publication No. 2002-321509, adopting sipes each of which forms a zigzag shape on a tread surface of the tire, and inside the block, has bent portions bent in a tire widthwise direction and ranging in a tire radial direction (refer to FIG. 14). On the other hand, Example 1 is the one adopting sipes in FIG. 2.

For these test tires, on-ice braking performances, wet braking performances, and wet cornering performances were respectively assessed by using the following test methods, and results thereof are shown in Table 1.

Wet Braking Performance:

Each of the test tires was mounted onto a front-engine rear-drive vehicle having a displacement of 2000 cc, with conditions being a rim size of 15×6.5JJ and an air pressure of 200 kPa. Then, braking was performed from a traveling state with 40 km/h on a frozen road, and a braking distance thereof was measured. The assessment results were represented in index numbers, which were obtained by using inverses of measured values and presuming the inverse for Conventional Example 1 to be 100. The larger index number means that the tire is more excellent in on-ice braking performance.

Wet Braking Performance:

Each of the test tires was mounted onto a front-engine rear-drive vehicle having a displacement of 2000 cc, with conditions being a rim size of 15×6.5JJ and an air pressure of 200 kPa. Then, braking was performed from a traveling state with 100 km/h on a wet road with a water depth of 1 mm, and a braking distance thereof was measured. The assessment results were represented in index numbers, which were obtained by using inverses of measured values and presuming the inverse for Conventional Example 1 to be 100. The larger index number means that the tire is more excellent in wet braking performance.

Wet Cornering Performance:

Each of the test tires was mounted onto a front-engine rear-drive vehicle having a displacement of 2000 cc, with conditions being a rim size of 15×6.5JJ and an air pressure of 200 kPa. Then, steady-state circular cornering with a radius of 30 m was performed on a wet road with a water depth of 1 mm, and a maximum lateral acceleration thereof was measured. The assessment results were represented in index numbers obtained by presuming a measured value for Conventional Example 1 to be 100. The larger index number means that the tire is more excellent in wet cornering performance.

TABLE 1

Figure 8:
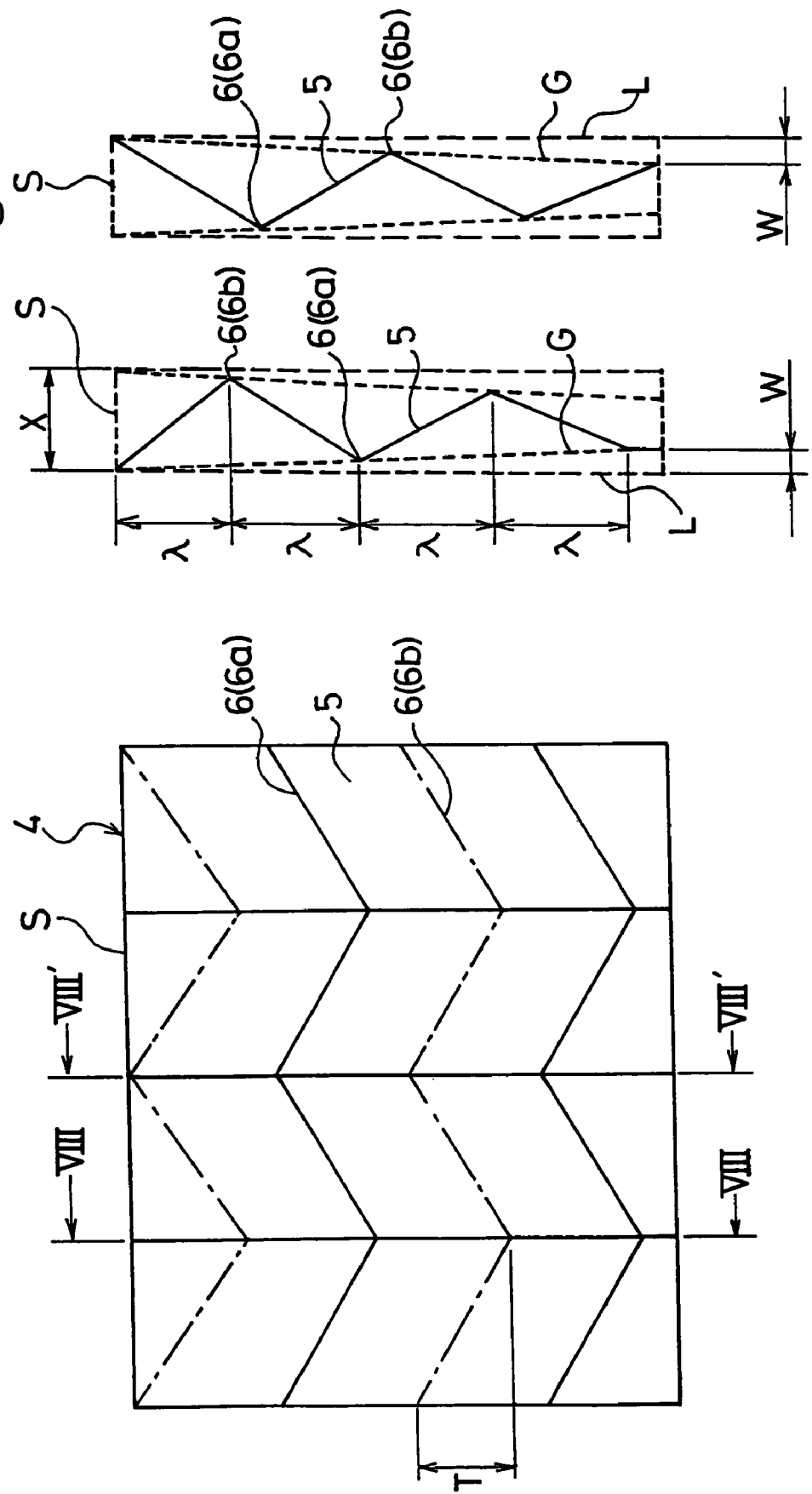
FIGS. 8a to 8c show parts of an inner side wall of the sipe in the block of the icy and snowy road pneumatic tire formed of a second other embodiment of the present invention.
Figure 9:
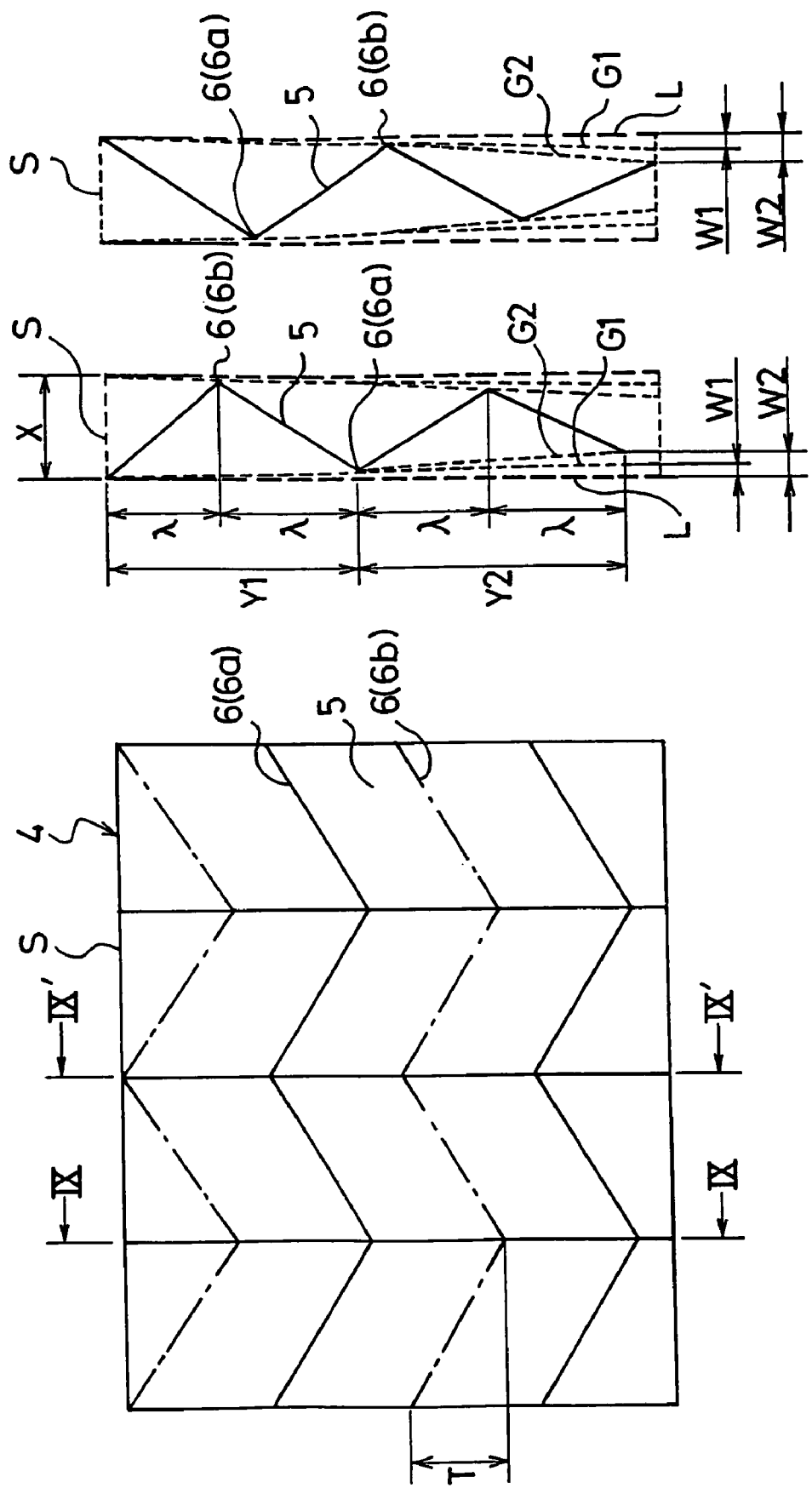
FIGS. 9a to 9c show parts of an inner side wall of a sipe in a block of an icy and snowy road pneumatic tire formed of a third other embodiment of the present invention.

|  | Conventional Example 1 | Conventional Example 2 | Conventional Example 3 | Example 1 |
|---|---|---|---|---|
| Sipe shape (drawing) | FIG. 8 | FIG. 9 | FIG. 10 | FIG. 2 |
| Sipe directionality | Not present | Present | Not present | Not present |
| On-ice braking performance | 100 | 103 | 95 | 103 |
| Wet braking performance | 100 | 103 | 95 | 103 |
| Wet cornering performance | 100 | 105 | 105 | 110 |

As is found from this Table 1, the tire for Example 1 was more excellent than those in Conventional Examples 1 to 3 in on-ice braking performance, wet braking performance, and wet cornering performance.

Next, tires for Examples 2 to 8 were prepared, by using the tire for Example 1 as reference, in a manner that the tires were made variously different in tilt angles a, b, c and d of the sipe and in amplitudes A, B, C and D of bent portions of the sipe compared with that in the reference.

For these test tires, on-ice braking performances were assessed, and failure incidences during vulcanization were also found. Results thereof are shown in Table 2. Note that the on-ice braking performances were represented in index numbers by presuming a value for Example 1 to be 100. The failure incidence is a percentage (%) of failed tires relative to a number of vulcanized tires when occurrence of failures such as a break and a cut damage generated by a sipe forming blade was inspected for vulcanized tires.

As is found from this Table 2, the tires for Examples 2 to 8 were with extremely low failure incidences while they had equivalent levels in on-ice braking performance to that of Example 1.

Next, tires for Examples 11 to 14 were prepared as icy and snowy road pneumatic tires each of which had a tire size of 195/65R15 91Q and a block pattern, and which were made variously different only in shape of the sipes provided in the block.

In each of these Examples 11 to 14, adopted were sipes in each of which a zigzag shape with an amplitude in the tire circumferential direction on the tread surface is formed, bent portions bent in a tire circumferential direction and ranging in a tire widthwise direction at at least two positions in the tire radial direction is formed inside a block, and a zigzag shape with an amplitude in the tire radial direction is formed in each of the bent portions. Additionally, in each of the sipes, intervals between the bent portions in the tire radial direction are constant, and amplitudes of the bent portions in the tire circumferential direction are smaller in a portion closer to the sipe bottom (refer to FIGS. 8a to 8c and FIGS. 9a to 9c). Note that, in each of Examples 13 and 14, shallow grooves with a depth of 0.3 mm were provided in a superficial portion of the block, and a vertical portion extending in a normal-line direction of the tread surface was provided in a section where the sipe joins to the tread surface.

For these test tires, by using the above-described test methods, on-ice braking performances, wet braking performances, and wet cornering performances were respectively assessed, and failure incidences during vulcanization were also found. Results thereof are shown in Table 3. In Table 3, results for Conventional Examples 1 to 3 described above are also shown.

TABLE 2

|  | Example 1 | Example 2 | Example 3 | Example 4 | Example 5 | Example 6 | Example 7 | Example 8 |
|---|---|---|---|---|---|---|---|---|
| Tilt angle a (degrees) | 35 | 40 | 30 | 45 | 40 | 40 | 40 | 40 |
| Tilt angle b (degrees) | 35 | 35 | 30 | 38 | 32 | 36 | 35 | 35 |
| Tilt angle c (degrees) | 35 | 30 | 25 | 32 | 23 | 33 | 30 | 30 |
| Tilt angle d (degrees) | 35 | 25 | 25 | 25 | 15 | 29 | 25 | 25 |
| Amplitude A (mm) | 1.2 | 1.2 | 1.2 | 1.2 | 1.2 | 1.2 | 0.5 | 0.5 |
| Amplitude B (mm) | 1.2 | 1.6 | 1.6 | 1.6 | 1.6 | 1.6 | 1.2 | 1.5 |
| Amplitude C (mm) | 1.2 | 2.1 | 2.1 | 2.1 | 2.1 | 2.1 | 1.9 | 2.5 |
| Amplitude D (mm) | 1.2 | 2.5 | 2.5 | 2.5 | 2.5 | 2.5 | 2.5 | 3.5 |
| On-ice braking performance | 100 | 104 | 99 | 106 | 100 | 105 | 98 | 103 |
| Failure incidence (%) | 18 | 0 | 0 | 0 | 0 | 0 | 0 | 0 |

TABLE 3

|  | Conventional Example 1 | Conventional Example 2 | Conventional Example 3 | Example 11 | Example 12 | Example 13 | Example 14 |
| --- | --- | --- | --- | --- | --- | --- | --- |
| Presence of vertical portion of sipe | Not present | Not present | Not present | Not present | Not present | Present | Present |
| Tilting of sipe auxiliary line | Not present | Not present | Not present | Constant | Not constant | Constant | Not constant |
| Distance W of auxiliary line | — | — | — | (1/4)× | — | (1/4)× | — |
| Distance W1 of auxiliary line | — | — | — | — | (1/10)× | — | (1/10)× |
| Distance W2 of auxiliary line | — | — | — | — | (1/4)× | — | (1/4)× |
| On-ice braking performance | 100 | 103 | 95 | 103 | 107 | 104 | 108 |
| Wet braking performance | 100 | 103 | 95 | 103 | 107 | 104 | 108 |
| Wet cornering performance | 100 | 105 | 105 | 110 | 110 | 110 | 110 |
| Failure incidence (%) | 10 | 20 | 15 | 2 | 2 | 0 | 0 |

As is found from this Table 3, the tires for Examples 11 to 14 were more excellent than those for Conventional Examples 1 to 3 in on-ice braking performance, wet braking performance, and wet cornering performance. Furthermore, all of the tires for Examples 11 to 14 were with extremely low failure incidences.

What is claimed is:

1. A pneumatic tire where a plurality of longitudinal grooves extending in a tire circumferential direction and a plurality of lateral grooves extending in a tire widthwise direction are provided in a tread portion, a plurality of blocks are defined by these longitudinal and lateral grooves, and a plurality of sipes extending in the tire widthwise direction are provided to each of the blocks, wherein, with regard to each of the sipes, a zigzag shape with an amplitude in the tire circumferential direction is formed on a tread surface, bent portions ranging in the tire widthwise direction while bent in the tire circumferential direction are formed inside the block at at least two positions in the tire radial direction, and a zigzag shape with an amplitude in the tire radial direction is formed in each of the bent portions, and wherein, while the amplitude of the sipe in the tire circumferential direction is set constant, a tilt angle of the sipe in the tire circumferential direction to a normal-line direction of the tread surface is set smaller at a portion closer to the bottom of the sipe than that in a portion closer to the tread surface, and the amplitude of the bent portions in the tire radial direction is set larger at a portion closer to the bottom of the sipe than that in a portion closer to the tread surface.

2. The pneumatic tire according to claim 1, wherein tilt angles of the sipe in the tire circumferential direction to the normal-line direction of the tread surface are not smaller than 30 degrees, but not larger than 45 degrees in the portion closest to the tread surface, and not smaller than 15 degrees, but smaller than 30 degrees in the portion closest to the sipe bottom, respectively.

3. The pneumatic tire according to any one of claims 1 and 2, wherein, the amplitude of the bent portions in the tire radial direction is set not less than 0.5 mm in the portion closest to the tread surface, and is set not more than 3.5 mm in the portion closest to the sipe bottom.

4. The pneumatic tire according to claim 1, wherein, on condition that the pneumatic tire is provided on a superficial portion of the block with a plurality of shallow grooves, whose depth is in a range of 0.1 to 1.0 mm, and which are shallower than the sipes, a vertical portion extending on a normal-line to the tread surface is provided to the sipe in a section where the sipe joins to the tread surface.

5. The pneumatic tire according to claim 4, wherein a height of the vertical portion of the sipe is set not less than the depth of the shallow groove.

* * * * *